United States Patent [19]

Ozawa et al.

[11] Patent Number: 5,075,276

[45] Date of Patent: Dec. 24, 1991

[54] CATALYST FOR PURIFICATION OF EXHAUST GASES

[75] Inventors: Masakuni Ozawa, Kasugai; Mareo Kimura; Akio Isogai, both of Nagoya; Shinichi Matsumoto, Aichi; Naoto Miyoshi, Nagoya, all of Japan

[73] Assignees: Kabushiki Kaisha Toyota Chuo Kenkyusho; Toyota Jidosha Kabushiki Kaisha, both of Japan

[21] Appl. No.: 342,060

[22] Filed: Apr. 24, 1989

[30] Foreign Application Priority Data

Apr. 30, 1988 [JP] Japan .................................. 63-108834

[51] Int. Cl.$^5$ ........................ B01J 21/04; B01J 21/06; B01J 23/10; B01J 32/00
[52] U.S. Cl. .................................... 502/304; 502/302; 423/213.5
[58] Field of Search .............................. 502/304, 302; 423/213.5

[56] References Cited

U.S. PATENT DOCUMENTS 4,271,044  6/1981  Fratzer et al. ................... 423/213.5
4,504,598  3/1985  Ono et al. ............................ 502/304
4,587,231  5/1986  Sawamura et al. ................ 502/304

Primary Examiner—W. J. Shine
Attorney, Agent, or Firm—Finnegan, Henderson, Farabow, Garrett & Dunner

[57] ABSTRACT

A catalyst for purification of exhaust gases, comprising a support substrate, a catalyst carrier layer formed on the support substrate and catalyst ingredients loaded on the catalyst carrier layer, wherein the catalyst carrier layer comprises alumina, cerium oxide, zirconium oxide and at least one oxide of rare earth element except cerium and lanthanum, and at least a part of cerium oxide, zirconium oxide and oxide of rare earth element except cerium and lanthanum is present in the form of composite oxide and/or solid solution. The catalyst for purification of exhaust gases is capable of purifying exhaust gases containing carbon monoxide (CO), hydrocarbons (HC) and nitrogen oxides (NOx).

11 Claims, No Drawings

CATALYST FOR PURIFICATION OF EXHAUST GASES

BACKGROUND OF THE INVENTION

1. Field of the Invention

This invention relates to a catalyst for purification of exhaust gases exhausted from internal combustion engines of automobiles and the like capable of purifying carbon monoxide (CO), hydrocarbons (HC) and nitrogen oxides (NOx) contained in the exhaust gases.

2. Related Art

As a conventional catalyst for purification of automobile exhaust gases, there has generally been known a catalyst comprising a support substrate, a catalyst carrier layer formed on the support substrate and catalyst ingredients loaded on the catalyst carrier layer. And, so far, there have been demonstrated various kinds of catalyst for purification of exhaust gases aiming at improving the purification property.

For example, some catalysts using cerium (Ce) have been disclosed in Japanese Examined Patent Publication (KOKOKU) Nos. 41775/1984 and 20307/1983, and Japanese Unexamined Patent Publication (KOKAI) No. 90695/1984. In these catalysts for purification of exhaust gases using cerium, the cerium is present in the oxide form. The cerium improves the purification property by discharging or storing oxygen (oxygen storing capability) according to the reaction shown in the formula (1) and by controlling the oxidation reaction of CO and HC and the deoxidation reaction of NOx.

$$CeO_2 \rightleftharpoons CeO_{2-x} + X/2O_2 \qquad (1)$$

It has been known that the reaction shown in the formula (1) occurs on the particle surface of cerium oxide. However, in the above mentioned conventional catalysts for purification of exhaust gases, the total surface area of the cerium oxide particles was reduced by the growth of the cerium oxide particles on using the conventional catalysts at elevated temperatures of 800° C. or more. Accordingly, there arises a disadvantage that the purification property has been degraded due to the worsening oxygen storing capability.

Also, some catalysts using other rare earth element and transition metals simultaneously with cerium for aiming at stabilization of activated alumina, have been disclosed in Japanese Examined Patent Publication (KOKOKU) No. 7537/1985, Japanese Unexamined Patent Publication (KOKAI) No. 18180/1973, U.S. Pat. No. 3,951,860 and U.S. Pat. No. 4,170,573. For example, a catalyst disclosed in Japanese Examined Patent Publication (KOKOKU) No. 7537/1985 discloses to use cerium and lanthanum (La) simultaneously to form composite oxide shown in the formula (2).

$$Ce_{1-x}La_xO_{2-x/2} \qquad (2)$$

$$(0.3 \leq x \leq 0.5)$$

In this catalyst for purification of exhaust gases, lattice defects with oxygen vacancies are formed in the fluorite structure of the composite oxide, so that the oxygen storing capability with durability can be achieved. Although the growth of cerium oxide particles is not so fast as that of the catalyst using cerium only, the growth of cerium oxide particles is increased and the purification property is worsened even in this catalyst for purification of exhaust gases.

SUMMARY OF THE INVENTION

Accordingly, it is an object of this invention to suppress the growth of cerium oxide particles at elevated temperatures, thereby providing a catalyst for purification of exhaust gases whose purification property is prevented from deteriorating.

A catalyst for purification of exhaust gases of this invention comprises a support substrate, a catalyst carrier layer formed on the support substrate and catalyst ingredients loaded on the catalyst carrier layer, wherein the catalyst carrier layer comprises alumina, cerium oxide, zirconium oxide and an oxide of a rare earth element except cerium and lanthanum, and at least a part of the cerium oxide, the zirconium oxide and the oxide of rare earth element except cerium and lanthanum is present in the form of composite oxide and/or solid solution.

The growth of cerium oxide particles can be suppressed effectively because at least a part of the cerium oxide, the zirconium oxide and the oxide of rare earth element except cerium and lanthanum is present in the form of composite oxide and/or solid solution, though the mechanism has not been found yet. Further, the oxygen mobility within the crystal composed of the composite oxide is facilitated and an excellent oxygen storing capability is ensured because the crystal structure of the composite oxide has lattice defects with oxygen vacancies.

Also, the growth of cerium oxide particles can be suppressed when the catalyst of this invention is used at elevated temperatures because the composite oxide particles hardly grow. Therefore, the total surface area of the cerium oxide particles can be kept at sufficient large values, thereby securing the purification property of the catalyst of this invention as high as possible even at elevated temperatures. Accordingly, the disadvantage of worsening oxygen storing capability of cerium oxide has been eliminated, and the high purification property can be maintained for a long period of time.

DETAILED DESCRIPTION OF THE INVENTION

A catalyst for purification of exhaust gases of this invention comprises a support substrate, a catalyst carrier layer formed on the support substrate and catalyst ingredients loaded on the catalyst carrier layer, wherein the catalyst carrier layer comprises alumina, cerium oxide, zirconium oxide and an oxide of a rare earth element except cerium and lanthanum, and at least a part of the cerium oxide, the zirconium oxide and the oxide of rare earth element except cerium and lanthanum is present in the form of composite oxide and/or solid solution.

It is the most important feature in the catalyst of this invention that the catalyst carrier layer comprises alumina, cerium oxide, zirconium oxide and at least one oxide of rare earth element except cerium and lanthanum, and at least a part of the cerium oxide, the zirconium oxide and the oxide of rare earth element except cerium and lanthanum is present in the form of a composite oxide and/or a solid solution.

The growth of cerium oxide particles is rapid when cerium oxide alone is present. For example, our research has demonstrated that a diameter of cerium oxide particle increases up to about 0.1 μm when heated at 1000° C. for five hours. Accordingly, even if the purification of CO is conducted according to the reaction of the formula (3) after heating at 1000° C., the reaction ratio has become almost zero and the oxygen storing capability has been lowered remarkably.

$$CO + CeO_2 \rightarrow xCO_2 + CeO_{2-x} \quad (3)$$

We have continued our research and found that the oxygen storing capability is ensured even after heating at elevated temperatures in case that the cerium oxide, the zirconium oxide and the oxide of rare earth element except cerium and lanthanum coexist and are heat-treated together.

The composite oxide and/or solid solution in the catalyst of this invention comprises at least a part of the cerium oxide, the zirconium oxide and the oxide of rare earth element except cerium and lanthanum. For example, the composite oxide and/or solid solution may be the following composite oxides and/or solid solutions: composite oxide and/or solid solution comprising cerium oxide and an oxide of a rare earth element except cerium and lanthanum; composite oxide and/or solid solution comprising zirconium oxide and an oxide of a rare earth element except cerium and lanthanum; composite oxide and/or solid solution comprising cerium oxide, zirconium oxide and an oxide of a rare earth element except cerium and lanthanum; and composite oxide and/or solid solution comprising mixtures of the above composite oxides and/or solid solutions. The composite oxides and/or solid solution may contain each of the oxides independently.

As for an oxide of a rare earth element, at least one oxide of rare earth element selected from the group consisting of praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) may be used. Although strictly speaking, yttrium (Y) and scandium (Sc) are not always considered to be rare earth elements, these elements are considered rare earth elements for the purposes of the present invention, and these elements may also be used.

As for the catalyst carrier layer loading the catalyst ingredients thereon, such materials having a large specific surface area as activated alumina, zirconia, titanium oxide and the like may be used. However, gamma-alumina and theta-alumina are generally used for the catalyst carrier layer. While, the catalyst carrier layer may be used as it is or formed on the surface of a support substrate.

As for the support substrate, a conventional support substrate such as a honeycomb-shape monolithic catalyst support substrate and a pellet-shape support substrate may be used. Also, as for the material of the support substrate, conventional ceramics such as cordierite, mullite, alumina, magnesia and spinel or conventional heat resistant metal such as ferritic steel may be used.

As for the catalyst ingredients loaded on the catalyst carrier layer, conventionally employed one may be used, e.g., noble metals such as platinum (Pt), rhodium (Rh), palladium (Pd), iridium (Ir), ruthenium (Ru), osmium (Os) and the like, and base metals such as chromium (Cr), nickel (Ni), vanadium (V), copper (Cu), cobalt (Co), manganese (Mn) and the like.

The composite oxide and/or solid solution having at least a part of the cerium oxide, the zirconium oxide and the oxide of rare earth element except cerium and lanthanum may be formed in the catalyst carrier layer by impregnating the catalyst carrier layer with three aqueous solutions of cerium salt, zirconium salt and a salt of a rare earth element simultaneously or independently, and burning the impregnated catalyst carrier layer at temperatures of 600° C. or more. Also, the composite oxide and/or solid solution may be formed by mixing at least one of the oxides of cerium, zirconium and a rare earth element with activated alumina powder when forming the catalyst carrier layer, and burning the catalyst carrier layer at temperatures of 800° C. or more. The cerium oxide and zirconium oxide may be present in the catalyst carrier layer, or they may be loaded on the surface of the catalyst carrier layer. In the latter case, the catalyst property is improved remarkably since the contact between the cerium oxide and zirconium oxide and the exhaust gases is facilitated and the oxygen storing capability is fully demonstrated.

There is no special limitation on the composition ratio between the cerium, the zirconium and the rare earth element. However, it is preferred that cerium oxide, zirconium oxide and an oxide of a rare earth element except cerium and lanthanum are present in the composite oxide and/or solid solution in such ratios that the number of zirconium atoms per 100 cerium atoms is from 5 to 100, and that the number of rare earth element atoms per 100 cerium atoms is from 5 to 150.

DETAILED DESCRIPTION OF THE PREFERRED EMBODIMENTS

Now, the present invention will be described with reference to the following Examples and Comparative Examples.

Example 1 and Comparative Example 1

700 g of alumina-sol with 10% by weight of alumina content, 1000 g of alumina powder and 300 g of distilled water were mixed and stirred to make slurry. Then, a honeycomb-shape cordierite monolithic catalyst support substrate was immersed in the slurry for 1 minute. After taking out of the slurry, the monolithic catalyst support substrate was subjected to an air flow to blow off the slurry in cells. Then, the monolithic catalyst support substrate was dried at 150° C. for 1 hour, and burned at 700° C. for 2 hours. This process was repeated twice to form a catalyst carrier layer comprising activated alumina on the monolithic catalyst support substrate.

Next, the monolithic catalyst support substrate with the above catalyst carrier layer formed thereon, was immersed in a mixed aqueous solution for 1 minute, in which 0.30 mol/l of cerium nitrate (Ce(NO$_3$)$_3$), 0.05 mol/l of zirconium oxynitrate (ZrO(NO$_3$)$_2$) and 0.05 mol/l of yttrium nitrate (Y(NO$_3$)$_3$) were dissolved. After taking out of the mixed aqueous solution, excess water was blown off. Then, the monolithic catalyst support substrate was dried at 200° C. for 3 hours and burned at 600° C. for 5 hours. Thus, a monolithic catalyst support substrate (A) having the catalyst carrier layer containing cerium oxide, zirconium oxide and yttrium oxide was obtained.

A monolithic catalyst support substrate (B) was obtained by the same manner for obtaining the monolithic catalyst support substrate (A) except that a mixed aqueous solution was used, in which 0.30 mol/l of cerium nitrate, 0.10 mol/l of zirconium oxynitrate and 0.10 mol/l of yttrium nitrate were dissolved.

Also, monolithic catalyst support substrates (C to E) containing cerium oxide, zirconium oxide and oxide of rare earth element were obtained by the same manner for obtaining the monolithic catalyst support substrate (A) except that ytterbium nitrate was used instead of yttrium nitrate in the monolithic catalyst support substrate (C), samarium nitrate was used instead of yttrium nitrate in the monolithic catalyst support substrate (D) and neodymium nitrate was used instead of yttrium nitrate in the monolithic catalyst support substrate (E).

Then, a monolithic catalyst support substrate (F) was obtained by the same manner for obtaining the monolithic catalyst support substrate (A) except that the monolithic catalyst support substrate was immersed in an aqueous solution only containing 0.30 mol/l of cerium nitrate. Further, a monolithic catalyst support substrate (G) was obtained by the same manner for obtaining the monolithic catalyst support substrate (A) except that the monolithic catalyst support substrate was immersed in a mixed aqueous solution containing 0.30 mol/l of cerium nitrate and 0.05 mol/l of yttrium nitrate and free from zirconium oxynitrate.

Next, each of the monolithic catalyst support substrates (A to G) thus obtained was loaded with catalyst ingredients as shown in Table 1. For loading the catalyst ingredients thereon, these monolithic catalyst support substrates were immersed in distilled water to have a sufficient amount of water absorbed therein and subjected to an air flow to blow off excess water after taking them out of the distilled water. Then, they were immersed in an aqueous solution containing dinitrodiamine platinum to load platinum for 1 hour, similarly in an aqueous solution containing rhodium chloride to load rhodium, and similarly in an aqueous solution containing palladium chloride to load palladium. After excess water was blown off, they were dried at 200° C. for 1 hour. After the drying, platinum, rhodium and palladium were loaded thereon. Thus, each catalyst for purification of exhaust gases of Examples 1a to 1e and Comparative Examples 1a and 1b as shown in Table 1 was obtained.

Each catalyst for purification of exhaust gases thus obtained was attached to an exhaust system of a 3 liter in-line 6-cylindered engine and an endurance test was conducted for 200 hours under the conditions that the air-fuel ratio (A/F) was 14.6 and the inlet gas temperature was 850° C. After the endurance test, each catalyst was attached to the exhaust system of an identical engine and conversions were measured for hydrocarbons (HC), carbon monoxide (CO) and nitrogen oxides (NOx) under the conditions that the air fuel ratio (A/F) was 14.6 and the inlet gas temperature was 400° C.

Also, each catalyst for purification of exhaust gases was attached to a gas burner and another endurance test was conducted for 100 hours under the condition that the inlet gas temperature was 1000° C. The results are shown collectively in Table 1.

TABLE 1

|  | Example 1 ||||| Comparative Example 1 ||
|---|---|---|---|---|---|---|---|
|  | 1a | 1b | 1c | 1d | 1e | 1a | 1b |
| Support Substrate | A | B | C | D | E | F | G |
| Ce (mol/l) | 0.30 | 0.30 | 0.30 | 0.30 | 0.30 | 0.30 | 0.30 |
| Zr (mol/l) | 0.05 | 0.10 | 0.05 | 0.05 | 0.05 | — | — |
| Rare Earth Element | Y | Y | Yb | Sm | Nd | — | Y |
| Addition of Rare Earth Element (mol/l) | 0.05 | 0.10 | 0.05 | 0.05 | 0.05 | — | 0.05 |
| Pt (g/l) | 1.5 | 1.5 | 1.5 | 1.0 | — | 1.5 | 1.5 |
| Pd (g/l) | — | — | 1.0 | 1.5 | — | — |
| Rh (g/l) | 0.3 | 0.3 | 0.3 | 0.3 | 0.3 | 0.3 | 0.3 |
| HC conversion (%) | 93 | 92 | 94 | 92 | 91 | 84 | 88 |
| CO conversion (%) | 92 | 93 | 92 | 93 | 90 | 83 | 89 |
| NOx conversion (%) | 93 | 95 | 93 | 92 | 90 | 84 | 89 |

EXAMPLE 2 AND COMPARATIVE EXAMPLE 2

1 l of gamma-alumina grained support substrate (manufactured by Nikki Universal Co.) having 100 to 150 $m^2/g$ of BET surface area and 300 to 400 angstrom of average pore diameter was immersed, dried and burned by the same manner as Example 1 and Comparative Example 1 except that different mixed aqueous solutions with different components concentrations were used. Next, each of the grained support substrates was pulverized into a powder with 7 μm of average particle diameter with a vibration mill. 100 parts by weight of each powder obtained, 30 parts by weight of an aqueous solution containing 40% by weight of aluminum nitrate and 100 parts by weight of water were mixed and milled for 1 hour to make slurry. Thereafter, a catalyst carrier layer was formed on the same honeycomb-shape cordierite monolithic catalyst support substrates as those of Example 1 by coating each slurry obtained by the same manner as Example 1. Further, amounts of cerium, zirconium and rare earth element were regulated by impregnating the above mixed aqueous solutions into the catalyst carrier layer with spray if necessary. Then, catalyst ingredients were loaded by the same manner as Examples 1a to 1e and Comparative Examples 1a and 1b. In this way, each catalyst for purification of exhaust gases of Examples 2a to 2e and Comparative Examples 2a and 2b shown in Table 2 was obtained.

The conversions of thus obtained catalysts for purification of exhaust gases were measured by the same manner as Example 1, and the results are shown in Table 2.

TABLE 2

|  | Example 2 ||||| Comparative Example 2 ||
|---|---|---|---|---|---|---|---|
|  | 2a | 2b | 2c | 2d | 2e | 2a | 2b |
| Ce (mol/l) | 0.30 | 0.30 | 0.30 | 0.30 | 0.30 | 0.30 | 0.30 |
| Zr (mol/l) | 0.05 | 0.10 | 0.05 | 0.05 | 0.05 | — | — |
| Rare Earth Element | Y | Y | Yb | Sm | Nd | — | Y |
| Addition of Rare Earth Element (mol/l) | 0.05 | 0.10 | 0.05 | 0.05 | 0.05 | — | 0.05 |
| Pt (g/l) | 1.0 | 1.0 | — | — | 0.5 | 1.0 | — |
| Pd (g/l) | — | — | 1.0 | 1.0 | 0.5 | — | 1.0 |
| Rh (g/l) | 0.1 | 0.1 | 0.1 | 0.1 | 0.1 | 0.1 | 0.1 |
| HC conversion (%) | 89 | 89 | 89 | 89 | 89 | 81 | 82 |
| CO conversion (%) | 88 | 89 | 90 | 89 | 90 | 82 | 83 |
| NOx conversion (%) | 87 | 88 | 88 | 89 | 89 | 81 | 82 |

EXAMPLE 3 AND COMPARATIVE EXAMPLE 3

Activated alumina powder obtained by pulverizing the grained support substrate used in Example 2, zirconium oxide powder, yttrium carbonate or neodymium carbonate and distilled water were mixed to make slurry, and catalyst carrier layers containing composite oxide and/or solid solution comprising zirconium oxide, yttrium oxide or neodymium oxide and both of them were formed by immersing the same honeycomb-shape cordierite monolithic catalyst support substrate used in Example 1, and by drying and burning by the same manner as Example 1. After forming the catalyst carrier layer, each of the monolithic catalyst support substrates was immersed in an aqueous cerium nitrate solution, each of them was burned by the same manner as Example 1. Then, catalyst ingredients were loaded thereon. Thus, each catalyst for purification of exhaust gases of Examples 3a and 3b shown in Table 3 was obtained. Note that, in a catalyst for purification of exhaust gases of Comparative Example 3, only activated alumina powder was used to make the slurry.

The conversions of thus obtained catalysts for purification of exhaust gases were measured by the same manner as Example 1, and the results are shown in Table 3.

EXAMPLE 4 AND COMPARATIVE EXAMPLE 4

Each catalyst for purification of exhaust gases of Examples 4a and 4b and Comparative Examples 4a and 4b shown in Table 3 was obtained by the same manner as Example 3 and Comparative Example 3 except that cerium carbonate powder was used instead of the zirconium oxide powder, zirconium oxychloride was used instead of the cerium nitrate, and that ferritic metal containing aluminum was used instead of honeycomb-shape cordierite monolithic catalyst support substrate.

The conversions of thus obtained catalysts for purification of exhaust gases were measured by the same manner as Example 1, and the results are shown in Table 3.

TABLE 3

|  | Example 3 | | Comparative Example 3 | Example 4 | | Comparative Example 4 | |
| --- | --- | --- | --- | --- | --- | --- | --- |
|  | 3a | 3b | 3 | 4a | 4b | 4a | 4b |
| Ce (mol/l) | 0.30 | 0.30 | 0.30 | 0.30 | 0.30 | 0.30 | 0.30 |
| Zr (mol/l) | 0.05 | 0.05 | — | 0.05 | 0.05 | — | — |
| Rare Earth Element | Y | Nd | — | Y | Nd | — | Y |
| Addition of Rare Earth Element (mol/l) | 0.05 | 0.05 | — | 0.05 | 0.05 | — | 0.05 |
| Pt (g/l) | 1.2 | 1.2 | 1.2 | — | — | — | — |
| Pd (g/l) | — | — | — | 1.2 | 1.2 | 1.2 | 1.2 |
| Rh (g/l) | 0.12 | 0.12 | 0.12 | 0.12 | 0.12 | 0.12 | 0.12 |
| HC conversion (%) | 90 | 91 | 87 | 88 | 88 | 83 | 84 |
| CO conversion (%) | 91 | 90 | 86 | 89 | 87 | 82 | 84 |
| NOx conversion (%) | 89 | 89 | 83 | 86 | 85 | 83 | 82 |

As can be seen from Tables 1 to 3, all Examples are superior to Comparative Examples with respect to the conversions. This is because at least a part of cerium oxide, zirconium oxide and oxides of rare earth element except cerium and lanthanum coexist in the form of composite oxide and/or solid solution in the catalysts for purification of exhaust gases in Examples.

What we claim is:

1. A catalyst for purification of exhaust gases, comprising a support substrate, a catalyst carrier layer formed on said support substrate and catalyst ingredients loaded on said catalyst carrier layer, wherein said catalyst carrier layer comprises: a high surface area material selected from the group consisting of alumina and titanium oxide; cerium oxide; zirconium oxide; and at least one oxide of a rare earth element other than cerium and lanthanum, and wherein there is formed a composite oxide and/or solid solution formed of (a) an oxide of said rare earth element and cerium oxide; (b) an oxide of said rare earth element and zirconium oxide; (c) an oxide of said rare earth element, cerium oxide and zirconium oxide; or (d) mixtures thereof.

2. A catalyst for purification of exhaust gases as claimed in claim 1, wherein said cerium oxide, said zirconium oxide and said oxide of said rare earth element are present in the form of composite oxide and/or solid solution in such ratios that the number of zirconium atoms per 100 cerium atoms is from 5 to 100 and that the number of rare earth element atoms per 100 cerium atoms is from 5 to 150.

3. A catalyst for purification of exhaust gases as claimed in claim 1, wherein said cerium oxide, said zirconium oxide and said oxide of said rare earth element are present in said catalyst carrier layer.

4. A catalyst for purification of exhaust gases as claimed in claim 1, wherein said composite oxide and/or solid solution in said catalyst carrier layer is formed by immersing said support substrate coated with activated alumina into three aqueous solutions of a cerium salt, a zirconium salt and a salt of said rare earth element simultaneously or independently, and by burning said support substrate immersed thereinto at a temperature of 600° C. or more.

5. A catalyst for purification of exhaust gases as claimed in claim 1, wherein said composite oxide and/or solid solution in said catalyst carrier layer is formed by mixing oxides of cerium, zirconium and said rare earth element with activated alumina powder, coating said mixture on said support substrate, and by burning said support substrate coated therewith at a temperature of 800° C. or more.

6. A catalyst for purification of exhaust gases as claimed in claim 1, wherein at least a part of said cerium, said zirconium, and said rare earth element is in the oxide form.

7. A catalyst for purification of exhaust gases as claimed in claim 1, wherein said material is titanium oxide.

8. A catalyst for purification of exhaust gases as claimed in claim 1, wherein said catalyst material is gamma-alumina or theta-alumina.

9. A catalyst for purification of exhaust gases as claimed in claim 1, wherein said support substrate is a honeycomb-shape monolithic catalyst support substrate or a pellet-shape support substrate.

10. A catalyst for purification of exhaust gases as claimed in claim 1, wherein said support substrate comprises one selected from the group consisting of cordierite, mullite, alumina, magnesia, spinel and ferritic steel.

11. A catalyst for purification of exhaust gases as claimed in claim 1, wherein said catalyst ingredients are at least one selected from the group consisting of platinum (Pt), rhodium (Rh), palladium (Pd), iridium (Ir), ruthenium (Ru), osmium (Os), chromium (Cr), nickel (Ni), vanadium (V), copper (Cu), cobalt (Co) and manganese (Mn).

* * * * *

UNITED STATES PATENT AND TRADEMARK OFFICE
CERTIFICATE OF CORRECTION

PATENT NO. : 5,075,276
DATED : December 24, 1991
INVENTOR(S) : MASAKUNI OZAWA ET AL.

It is certified that error appears in the above-identified patent and that said Letters Patent is hereby corrected as shown below:

Claim 8, column 8, line 49, before "material" delete "catalyst".

Signed and Sealed this

Thirtieth Day of March, 1993

Attest:

STEPHEN G. KUNIN

*Attesting Officer*  Acting Commissioner of Patents and Trademarks